United States Patent [19]
Fix et al.

[11] 3,937,080
[45] Feb. 10, 1976

[54] ELECTROMAGNETIC APPARATUS FOR MEASURING THE FLOW VELOCITY OF AN ELECTRICALLY CONDUCTIVE FLUID AND METHOD OF CALIBRATION THEREOF

[76] Inventors: Izrail Grigorievich Fix, ulitsa Artema, 108, kv. 61; Alexei Sergeevich Morokhovsky, ulitsa Cheljuskintsev, 184, kv. 6, both of Donetsk; Mikhail Yakovlevich Gammerman, Gustamyae Lee, 137, kv. 8, Tallin; Benno Abramovich Khaitin, Tammsaare Lee, 100, kv. 81, Tallin; Tynis Eduardovich Laar, Khaigru, 5, kv. 6, Tallin; Volf Iolevich Mezhburd, Bulvar Karla Marxa, 78, kv. 26, Tallin, all of U.S.S.R.

[22] Filed: Aug. 31, 1973

[21] Appl. No.: 393,678

[52] U.S. Cl. ................................. 73/194 EM; 73/3
[51] Int. Cl.² ......................................... G01F 1/58
[58] Field of Search .................... 73/194 EM, 181, 3

[56] References Cited
UNITED STATES PATENTS

| | | | |
|---|---|---|---|
| 3,161,047 | 12/1964 | Griswold | 73/181 X |
| 3,633,401 | 1/1972 | Wada | 73/3 |
| 3,745,824 | 7/1973 | Mannherz et al. | 73/194 EM |

FOREIGN PATENTS OR APPLICATIONS

| | | | |
|---|---|---|---|
| 1,279,529 | 11/1961 | France | 73/194 EM |

*Primary Examiner*—Charles A. Ruehl
*Attorney, Agent, or Firm*—Haseltine, Lake & Waters

[57] ABSTRACT

An electromagnetic apparatus for measuring the flow velocity of an electrically conductive fluid is placed in the fluid flow and has a pair of pipe portions, one pipe portion being placed within the other. Means is provided for producing a magnetic field in the fluid flow, this means being mounted between pipe portions. The pipe portions carry a number of electrodes positioned at right angles to both the direction of the fluid flow and the direction of the produced magnetic field and serving to sense the electric potential.

Calibration of the apparatus is performed by passing the fluid flow through the internal pipe portion, the potential difference proportional to the fluid flow velocity being sensed by electrodes mounted on the internal pipe portion.

The internal pipe portion makes it possible to calibrate the apparatus with small amount of fluid flow.

In case the apparatus is employed to measure flow velocity in pipelines, the internal pipe portion of said apparatus can be made to extend through the wall of the pipeline, and this allows to check the apparatus in operation.

To increase the intensity of the magnetic field, a magnetic core is inserted into the internal pipe portion. In this case, for the time of calibration this magnetic core is replaced by an equivalent magnetic core mounted outside the outer pipe portion.

16 Claims, 7 Drawing Figures

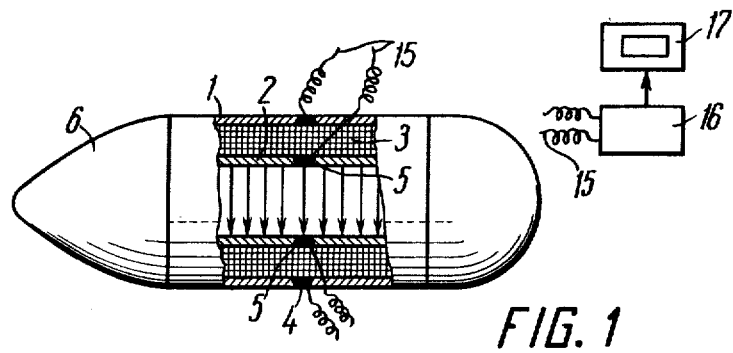
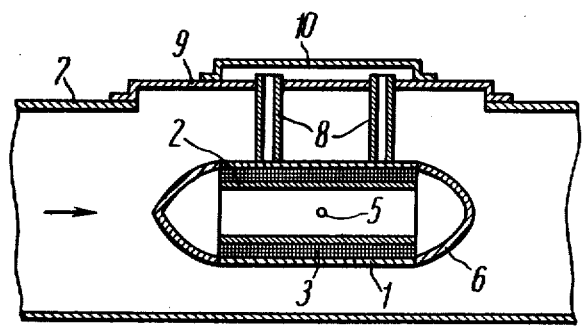
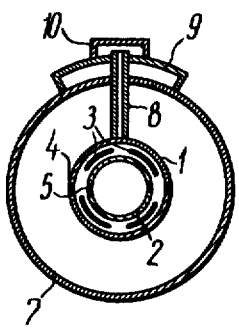
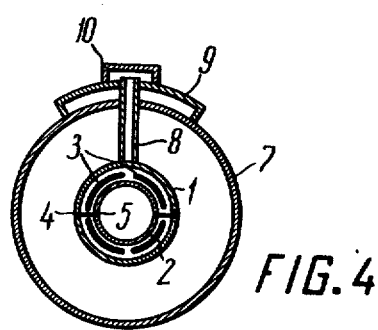
FIG. 1
FIG. 2
FIG. 3
FIG. 4

ELECTROMAGNETIC APPARATUS FOR MEASURING THE FLOW VELOCITY OF AN ELECTRICALLY CONDUCTIVE FLUID AND METHOD OF CALIBRATION THEREOF

The invention relates to means for measuring flow velocities and flow rates of electrically conductive fluids and in particular to an electromagnetic apparatus for measuring the flow velocities of an electrically conductive fluid in large diameter pipelines and in open channels and to a method of calibration thereof.

Some types of electromagnetic apparatuses for measuring the flow velocity of an electrically conductive fluid in large diameter pipelines and in open channels are widely known. Such measuring apparatuses are positioned either outside the pipeline or inside the fluid flow.

The known electromagnetic velocity meters which are externally placed on the pipelines usually include a measuring length of the pipeline made of a nonmagnetic material, means for producing a magnetic field, this means being mounted on the outside of the measuring length of the pipeline and generating a magnetic flux at right angles to the direction of the fluid flow and means for sensing the electric potential in the flowing fluid, this means being arranged in the form of a pair of electrodes mounted along a diameter of the pipeline at right angles to the direction of the fluid flow and to the direction of the magnetic field.

It is characteristic for such velocity meters that the size of the means for producing a magnetic field, as well as power consumption and costs, rapidly increase with the increase of the pipeline diameter. Moreover, for each diameter of the pipeline a proper size of the meter is required. This presents an obstacle to the unification of electromagnetic velocity meters and makes them more expensive.

The main difficulty with the above mentioned velocity meters arises when the calibration and checking thereof are made by a direct method, which consists in actually passing fluid through the velocity meter and requires large amounts of fluid corresponding to the large diameter pipelines for which the velocity meter is designed. Owing to this, the calibration stands should be extremely large in size and expensive, and it is usually preferably to use indirect methods of calibration which, though somewhat satisfactory, are not accurate enough.

There are also electromagnetic velocity meters which are immersed in the fluid flow. They include means for producing a magnetic field, said means being positioned in a housing of streamlined shape. When a fluid flows in the magnetic field, an electric field is generated in this fluid. The electric potential generated in the fluid is sensed by a pair of electrodes mounted at the ends of the housing diameter.

These velocity meters are relatively small in size but their direct calibration and checking for large diameter pipelines are also performed on complicated calibration stands and require large amounts of fluid.

In the known electromagnetic velocity meters positioned on the outside of the pipeline, to reduce the required amount of fluid flow, for the time of checking a flat duct having a rectangular cross section is placed within the measuring length of the pipeline, the flat duct having a pair of electrodes extending transversely through the opposed walls of the duct. The flat duct is located within the measuring length of the pipeline in such a way that the pair of electrodes are positioned along a diameter of the pipeline at right angles to the direction of the magnetic field. With this arrangement, only a small amount of fluid flow is necessary for the checking of electromagnetic velocity meters. But this method does not solve the problem of the checking of the velocity meters in operating conditions without interruption of the production process, as for the time of checking it is necessary to disconnect the velocity meter from the production circuit, to check it and to reinstall it in the production circuit.

Accordingly, it is an object of the present invention to provide a new and improved electromagnetic apparatus for measuring the flow velocity and flow rate of an electrically conductive fluid in the large diameter pipelines and channels, the apparatus to be so arranged that only a small amount of fluid is necessary for its calibration.

Another object of the invention is to provide a possibility of checking electromagnetic velocity meters in the operation, without dismantling.

Still another object of the invention is to provide a possibility of using for a range of pipelines of different sizes one relatively small size of the velocity meter with negligible power consumption and active losses.

Still another object of the invention is to provide a method of calibration of the electromagnetic velocity meters requiring only small amounts of the fluid flow passing through the inner tubular duct.

Yet another object of the invention is to provide a method of calibration of the electromagnetic velocity meter with a magnetic core in the inner tubular duct.

With these and other objects in view, the present invention provides apparatus for measuring the flow velocity of an electrically conductive fluid, the apparatus being positioned within the fluid flow and comprising means for producing a magnetic field in the fluid flow and means for sensing the electric potential developed in the fluid flow as a consequence of the produced magnetic field, this means being mounted at right angles both to the direction of the flow and to the direction of the produced magnetic field. According to the invention the means for producing a magnetic field is mounted between two pipe portions one of which is placed within the other, and the means for sensing the electric potential is arranged in the form of two groups of electrodes of which the first one is mounted on the external surface of the outer pipe portion and serves for sensing the electric potential corresponding to the velocity of the fluid flow, and the second one is mounted on the inner surface of the internal pipe portion and serves for sensing the electric potential corresponding to the velocity of fluid passing through this pipe portion.

The pipe portions are preferably of a non-magnetic material electrically insulated from the fluid.

The pipe portions can be of an electrically insulating material.

One pipe portion is preferably coaxially positioned within the other.

When the velocity meter is placed within a pipeline the internal pipe portion preferably extends through the wall of the pipeline.

The electrodes of the first group can be electrically connected in pairs with the electrodes of the second group.

The space between the pipe portions, with the means for producing the magnetic field positioned in it, is preferably filled with an electrically insulating compound.

The cross-cut ends of the pipe portions are preferably covered by detachable cowls.

A magnetic core can be placed in the internal pipe portion.

The magnetic core is preferably insulated from the electrodes mounted on the internal pipe portion in case when those electrodes are electrically connected in pairs to the electrodes mounted on the outer pipe portion.

With these and other objects in view, the essence of the present invention resides in that the method of calibration of the electromagnetic apparatus for measuring the flow velocity of an electrically conducting fluid is realized, according to the invention, by that a duct of the internal pipe portion is connected to a calibration device and a flow of fluid is forced through, a group of electrodes mounted on the inner surface of internal pipe portion is connected for the duration of calibration to the indicator of an electromagnetic velocity meter, a magnetic field is produced by the means for producing a magnetic field located on the internal pipe portion, which magnetic field is normal to the flow of fluid and the electromagnetic velocity meter is calibrated in the velocity of the fluid flow forced through the duct of the internal pipe portion, determined by the readings of the calibration device.

If the apparatus for measuring the flow velocity has a magnetic core in the internal pipe portion, during the calibration of the apparatus this magnetic core may be replaced by an equivalent magnetic core positioned outside the outer pipe portion and having the radius of the inner surface.

$$r_1 = \frac{r_2^2 + r_2 r_3 + r_3^2}{3 r_4}$$

where:

$r_1$ is the radius of the inner surface of the equivalent magnetic core, $r_2$ is the radius of the inner surface of the means for producing the magnetic field, $r_3$ is the radius of the external surface of the means for producing the magnetic field, $r_4$ is the radius of the external surface of the magnetic core, the equality of currents passing through the means for producing the magnetic field before and after the replacement of the magnetic core by an equivalent magnetic core being achieved by inserting adjusting rings.

The above-mentioned and other objects and advantages of the invention will become more apparent from the following discription of the preferred embodiments of the invention which are represented in the accompanying drawings, wherein:

FIG. 1 is a general view of an electromagnetic apparatus for measuring the flow velocity of an electrically conductive fluid in accordance with the present invention;

FIG. 2 shows a longitudinal section of the apparatus of FIG. 1 positioned in a pipeline along its axis in accordance with the present invention;

FIG. 3 shows a cross-sectional view of the apparatus of FIG. 1 positioned in a pipeline along its axis in accordance with the present invention;

FIG. 4 shows a cross-sectional view of an electromagnetic apparatus for measuring the flow velocity of an electrically conductive fluid, wherein the electrodes mounted on the internal pipe portion are electrically connected in pairs with the electrodes mounted on the outer pipe portion in accordance with the invention;

Figure 5:
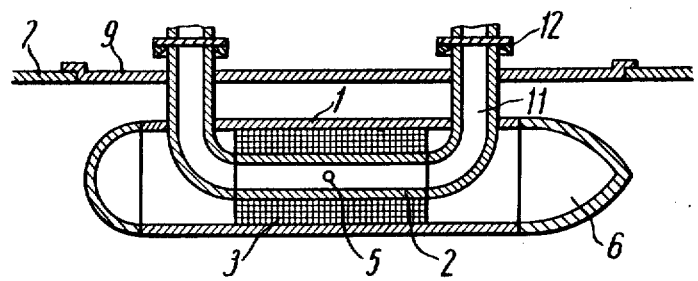
FIG. 5 shows a longitudinal section of an electromagnetic apparatus for measuring the flow velocity of an electrically conductive fluid, wherein the internal pipe portion extends through the wall of the pipeline in accordance with the invention.

The electromagnetic apparatus for measuring the flow velocity of an electrically conductive fluid shown on the FIG. 1 has two pipe portions 1 and 2 of different diameters.

The pipe portion 2 is coaxially positioned within the pipe portion 1, both pipe portions being circular in cross-section. The pipe portions 1 and 2 can be of an electrically insulating material or of a non-magnetic material insulated from the fluid. Means for producing a magnetic field is placed in the space between the pipe portions 1 and 2, and is made in the form of exciting coils 3.

Means for sensing the electrical potential developed in the fluid flow as a consequence of the produced magnetic field is arranged in the form of two groups of electrodes. The electrodes of the first group 4 are positioned on the external surface of the outer pipe portion 1 and the electrodes of the second group 5 are positioned on the inner surface of the internal pipe portion 2. The electrodes of the two groups 4 and 5 are mounted along a diameter of the pipe portions at right angles to the direction of the fluid flow and to the direction of the magnetic field.

The shape and the cross-section of the outer pipe portion 1 are governed by the shape of the exciting coils 3 and should also comply with the requirements of hydrodynamics, in particular, there should be no turbulence in the fluid flow at places where the electrodes 4 are mounted.

Opposite ends of the pipe portions 1 and 2 are closed by removable cowls 6 preferably of streamlined shape.

To eliminate fluid penetration into the means for producing a magnetic field and to increase reliability and rigidity of thee apparatus, the space between the pipe portions, with the exciting coils positioned in it, is filled with an electrically insulating compound.

An alternative embodiment of the invention is possible, wherein said electrically insulating compound, with the exciting coils positioned in it, acts as the internal and outer pipe portions 1 and 2. In this case a duct is formed in the compound, and electrodes 4 and 5 are placed in the compound so that they come into contact with the fluid flow to be measured.

To install the electromagnetic apparatus for measuring the flow velocity, hole is cut in the wall of a pipeline 7 through which hole the apparatus is inserted into the pipeline. The apparatus is fixed to the hole cover 9 by means of two structs 8 which are streamlined in section so as not to cause turbulence. The struts 8 contain the leads (not shown) to the coils and to the electrodes of the two groups. The ends of the leads are closed by a cover 10.

FIG. 3 shows by the way of example a cross-sectional view of an apparatus installed in the pipeline 7 and having the means for producing a magnetic field in the form of two exciting coils 3 positioned symmetrically with respect to the straight line on which the two groups of electrodes 4 and 5 are placed.

FIG. 4 shows a possible embodiment of the invention, wherein the electrodes 4 are electrically connected in pairs with the electrodes 5. In this case the struts 8 contain only one pair of leads for the two groups of electrodes 4 and 5.

To check the apparatus in operating conditions, without dismantling it, the internal pipe portion 2 (FIG. 5) is provided with a pair of tubes II extending through the wall of the pipeline 7. The ends of the tubes II are covered by end caps 12. Said tubes are attached to the cover 9 and thus the fixed position of the apparatus inside the pipeline is ensured. The form and the length of the tubes II are selected in compliance with the requirements of hydrodynamics. The leads to the electrodes and to the exciting coils can be attached to the tubes II. Such an arrangement allows to measure simultaneously the velocity and the flow rate of two fluid flows, for example in heat-exchangers. In this case the groups of electrodes 4 and 5 should be connected to two independent indicators, or they can be connected to one indicator provided switching-over is ensured.

To increase the magnetic flux and the sensivity of the apparatus, a magnetic core 13 can be placed inside the inner pipe portion. The length of the magnetic core 13 can be equal to or less than that of the inner pipe portion 2. The magnetic core can be of electric sheet steel.

Figure 7:
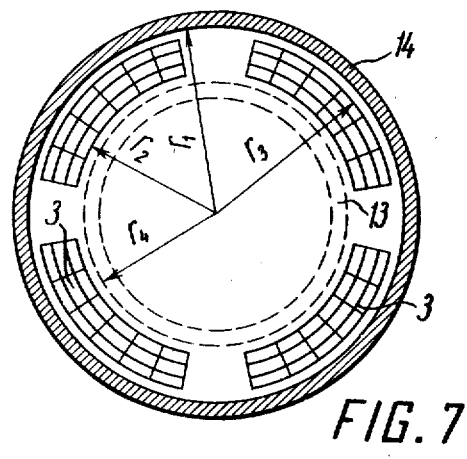
FIG. 7 is a cross-sectional view of an electromagnetic apparatus for measuring the flow velocity of an electrically conductive fluid, wherein an equivalent magnetic core is placed outside the outer pipe portion in accordance with the invention.

Calibration of the apparatus having a magnetic core is performed by replacing, for the time of calibration, the magnetic core 13 mounted inside the internal pipe portion by an equivalent magnetic core 14 mounted outside the outer pipe portion (FIG. 7).

The apparatus of the present invention is based on the law of electromagnetic induction according to which in the fluid flowing at right angles to the magnetic field an electric field is generated which is proportional to the velocity of the flow. When a current is passed through the exciting coils 3 the produced magnetic field would extend transversely across the internal pipe portion 2 and the outside area limited by the pipeline 7, wherein the apparatus is installed. As an unambiguous functional dependence exists between the magnetic fluxes inside the internal pipe portion 2 and outside the apparatus, the potential differences sensed by the electrode groups 4 and 5 in the fluid flowing with the same speed through the internal pipe portion 2 or through the pipeline 7 would be proportional to each other and would differ by a constant factor which depends on the dimensions of the apparatus and may equal unity.

Thus for flow velocity measurements both the internal pipe portion 2 and the area outside the apparatus can be used.

In the proposed apparatus the duct formed by the internal pipe portion 2 is utilized, in the main, for calibration and checking of the apparatus by passing small amounts of fluid, and the area outside the apparatus serves for flow velocity measurements.

After the apparatus is manufactured, it should be calibrated.

Calibration of the apparatus is performed on a calibration stand corresponding to the inner diameter of the internal pipe portion 2 (FIG. 1). The cowls 6 are removed, the apparatus is installed on the stand, and the duct formed by the internal pipe portion 2 is connected by means of tubes with a measuring tank of the calibration stand.

The electrodes 5, which are in contact with the fluid flowing through the duct formed by the internal pipe portion, are connected by leads 15 to an amplifier 16 which, in turn, is connected to an indicator 17. When electric current is passed through the exciting coils 3, a magnetic field is generated across the fluid flow passing through the duct formed by the internal pipe portion 2, this magnetic field inducing an electric field in the fluid. The potential difference developed in the fluid is sensed by the electrodes 5 and serves a measure of the flow velocity. For the purpose of calibration the fluid is passed with different velocities through the duct formed by the inner pipe portion 2, and the relation is established between the readings of the apparatus and the values of the flow velocity determined with the aid of the measuring tank. Flow rates are selected for the calibration in accordance with the relation existing between the cross-sectional area of the duct formed by the internal pipe portion and of the pipeline in which the apparatus is to be installed.

For example, if the diameters of the internal pipe portion duct and of the pipeline are in the ratio of 1:10, then the maximum flow rate required for calibration of the apparatus is almost 100 times less than the maximum flow rate to be measured in the pipeline. For the calibration of the apparatus a coefficient is introduced to account for unequality of the potential differences sensed by the electrodes 4 and 5 when the fluid having the same velocity flows through the duct formed by the internal pipe portion 2 and through the area outside the apparatus. The value of this coefficient depends on the dimensions of the apparatus, and in optimal case it can equal unity.

The calibration being over, the electrodes 5 are disconnected from the amplifier 16 and from the indicator 17. The cross-cut ends of the apparatus are covered by the cowls 6, after which the apparatus can be installed in a pipeline of a large diameter and used for the actual measurements.

For the actual use the apparatus is installed in a fluid flow, for example, in the pipeline 7 (FIG. 2).

The fixed position of the apparatus in the pipeline 7 is achieved by means of two struts 8 attached to the cover 9. The leads 15 (FIG. 1) connect the electrodes 4 through the amplifier 16 to the indicator 17, and the exciting coils 3 are connected to a source of supply (not shown on the FIG. 1).

When the electric current is passed through the exciting coils 3, a magnetic field is generated which extends transversely across the fluid flow in the pipeline and induces an electrical field in the flow. The potential difference developed in the fluid flow is sensed by the electrodes being in contact with the fluid flow. The potential difference is a measure of velocity of the fluid flow in which the apparatus is installed.

If the pipeline cross-sectional area and the law of velocity distribution across the fluid flow are known, the potential difference sensed by the electrodes can serve a measure of the fluid flow rate in the pipeline 7.

To check the apparatus in the operating conditions, the leads 15 (FIG. 1) of the electrodes 4 are disconnected from the indicator 17 and, instead of them, leads of the electrodes 5 (FIG. 5) are connected to this indicator. The end caps 12 are removed, and the tubes 11 are connected to the checking device. Through the internal pipe portion a fluid is passed having the properties similar to those of the fluid flowing through the pipeline 7 in the operating conditions, and then a magnetic field is produced across the fluid flow.

The checking of the apparatus is performed by comparing the readings of the indicator 17 (FIG. 1) to the readings of the checking device.

After checking, the leads of the electrodes 4 are again connected (instead of the leads of the electrodes 5) to the indicator 17 through the amplifier 16, the end caps 12 (FIG. 5) are reinstalled, and the apparatus is ready for the actual use.

As is clear from the description of the calibration, checking and actual use of the apparatus, the electrodes 4 and 5 (FIG. 1) are used alternatively — the electrodes 5 are used for calibration and checking, that is for measurements of the flow velocity in the duct formed by the internal pipe portion 2, and the other group of electrodes 4 is used in the operating conditions, that is for measurements of the flow velocity outside the apparatus. To simplify the apparatus, the electrodes 4 (FIG. 4) can be electrically connected in pairs with the electrodes 5. With this arrangement, it is also possible to measure the velocity difference of two flows passing simultaneously through the inner pipe portion 2 and outside the apparatus.

Figure 6:
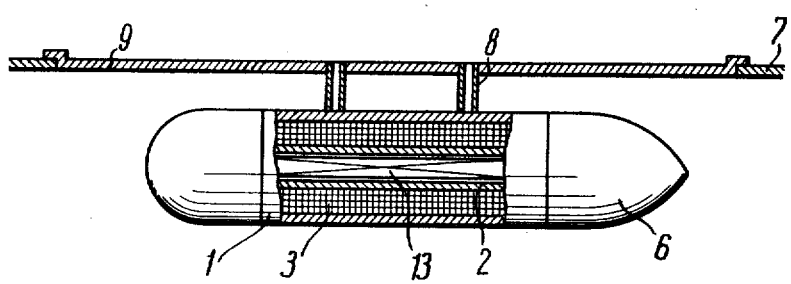
FIG. 6 is a longitudinal section of an electromagnetic apparatus for measuring the flow velocity of an electrically conductive fluid, wherein a magnetic core is placed in the internal pipe portion in accordance with the invention.

To increase the sensitivity of the apparatus, a magnetic core 13 is placed in the internal pipe portion 2 (FIG. 6).

It should be noted that when such a magnetic core 13 is mounted inside the internal pipe portion 2 (FIG. 4), the group of electrodes 5 should be electrically insulated from the magnetic core.

To allow for the influence of the magnetic core 13 on the calibration characteristic, a coefficient is introduced which represents the ratio of magnetic induction values in several characteristic points outside the apparatus, in proximity to the electrodes 4, before and and after the insertion of the magnetic core 13. The limited accuracy of the magnetic field induction measurements in the operating conditions causes additional errors. To achieve higher accuracy of the apparatus, for the time of calibration the equivalent magnetic core 14 is mounted on the outside of the apparatus (FIG. 7), the parameters of this magnetic core 14 being so selected as to ensure the same sensitivity of the apparatus during its calibration and in the actual use, i.e. when the magnetic core 13 is inserted in the internal pipe portion. This is achieved when the two magnetic cores cause an identical increase in the magnetic flux and an identical change of the inductance of the exciting coils producing this field.

With symmetrically positioned exciting coils, the identical influence on the sensitivity of the apparatus is produced by magnetic cores having the parameters determined by the following relation $$r_1 = \frac{r_2^2 + r_2 r_3 + r_3^2}{3 r_4} \qquad (1)$$

where
- $r_1$ is the radius of the inner surface of the equivalent magnetic core,
- $r_2$ is the radius of the inner surface of the exciting coils,
- $r_3$ is the radius of the external surface of the exciting coils,
- $r_4$ is the radius of the external surface of the magnetic core.

The process of calibration consists in the following. Before calibration, the inductance of the magnetic system consisting of the exciting coils 3 (FIG. 6) and the magnetic core 13 is measured. Then the magnetic core 13 is removed and replaced by the magnetic core 14 (FIG. 7) mounted around the external surface of the apparatus and having the radius of the inner surface as determined by the relation (1).

After this the inductance of the magnetic system consisting of the exciting coils 3 and the equivalent magnetic core 14 is measured. The inductances of this system and the system including the magnetic core 13 should be the same. If they are not identical, due to inaccuracy of the manufacturing of the magnetic core 14, it is necessary to regulate its parameters by inserting adjusting rings until the identity of the inductance values is achieved with required accuracy. In both cases current intensity in the magnetic system may serve a measure of inductance under stable a.c. voltage and frequency.

Then the apparatus with the equivalent magnetic core 14 is installed in the stand, where it is calibrated in accordance with the described method, and its calibration is performed using the duct formed by the internal pipe portion. When the calibration is over, the equivalent magnetic core 14 is removed, and the magnetic core 13 is reinstalled in the apparatus. The position of the magnetic core 13 is checked by measuring the intensity of current passing through the means for producing a magnetic field.

With the proposed method, the calibration accuracy may be considerably improved.

It should now be apparent that in accordance with the concept of the invention — an apparatus placed in the fluid so that the latter flows past it; with a duct of an insulating material positioned inside said apparatus — only a small amount of liquid is required to calibrate and check an electromagnetic apparatus for measuring flow velocities in large diameter pipes and open channels. This allows to eliminate complicated calibration stands. Moreover, if said duct extends through the wall of the pipeline in which the flow velocity is measured, the velocity meter can be checked in the operating conditions without mantling and dismantling it. It is evident that the velocity meter of described construction may be also employed to measure the flow velocities in two pipelines simultaneously.

In addition, with this invention, it is possible to use one size of the velocity meter for a range of pipes having different diameters, without additional calibration.

It should be noted that the described apparatus is small in size and weight.

Obviously, numerous modifications and variations are possible within the scope of the appended claims.

We claim:

1. Electromagnetic apparatus for measuring the flow velocity of an electrically conductive fluid, the apparatus being positioned within the fluid flow and comprising a pair of pipe portions of different diameters, one pipe portion being placed within the other; means for producing a magnetic field in the fluid, said means being mounted between said pipe portions; means for sensing the electric potential developed in the fluid flow as a consequence of the produced magnetic field, said means being mounted at right angles both to the direction of the flow and to the direction of the produced magnetic field and consisting of two groups of electrodes of which the first one is mounted on the external surface of said outer pipe portion and serves for sensing the electric potential corresponding to the velocity of the fluid flow, and the second one is mounted on the inner surface of said internal pipe portion and serves for sensing the electric potential corresponding to the velocity of the fluid passing through this pipe portion, an indicator whereto one of said groups of electrodes is connected and which reads the measured fluid flow velocity.

2. Apparatus according to claim 1, wherein said electrodes of the first group mounted on said outer pipe portion are electrically connected in pairs to said electrodes of the second group mounted on said internal pipe portion.

3. Apparatus according to claim 2, wherein said pipe portions are of an electrically insulating material.

4. Apparatus according to claim 2 wherein said pipe portions are of a non-magnetic material electrically insulated from the fluid.

5. Apparatus according to claim 2, wherein a magnetic core is placed in said internal pipe portion, said magnetic core being electrically insulated from said group of electrodes mounted on the inner surface of said internal pipe portion.

6. Apparatus according to claim 2, further including detachable cowls positioned at the two opposite ends thereof.

7. Apparatus according to claim 2, inserted in a pipeline and further including two tubes connected to the ends of said inner pipe portion and extending through the wall of said pipeline.

8. Apparatus according to claim 2, further including an electrically insulating compound filling the space between said internal and outer pipe portions to seal in the components disposed therein.

9. Apparatus according to claim 2, wherein said internal pipe portion is coaxially positioned within said outer pipe portion.

10. Apparatus according to claim 1, wherein said pipe portions are of an electrically insulating material.

11. Apparatus according to claim 1, wherein said pipe portions are of a non-magnetic material electrically insulated from the fluid.

12. Apparatus according to claim 1, wherein a magnetic core is placed in said internal pipe portion.

13. Apparatus according to claim 1, further including detachable cowls positioned at the two opposite ends thereof.

14. Apparatus according to claim 1, inserted in a pipeline and further including two tubes connected to the ends of said inner pipe portion and extending through the wall of said pipeline.

15. Apparatus according to claim 1, further including an electrically insulating compound filling the space between said internal and outer pipe portions to seal in the components disposed therein.

16. Apparatus according to claim 1, wherein said internal pipe portion is coaxially positioned within said outer pipe portion.

* * * * *